(12) United States Patent
Quiring et al.

(10) Patent No.: US 6,996,091 B2
(45) Date of Patent: *Feb. 7, 2006

(54) CENTRAL OFFICE LINE CARD WITH CODE RECOGNITION FOR INCREASING DATA RATES OVER PSTN

(75) Inventors: Keith L. Quiring, Dallas, TX (US); Alan Gatherer, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 888 days.

This patent is subject to a terminal disclaimer.

(21) Appl. No.: 09/953,036

(22) Filed: Sep. 13, 2001

(65) Prior Publication Data

US 2002/0024966 A1 Feb. 28, 2002

Related U.S. Application Data

(62) Division of application No. 09/103,496, filed on Jun. 24, 1998.

(51) Int. Cl.
*H04L 12/66* (2006.01)

(52) U.S. Cl. ..................... 370/352; 370/468
(58) Field of Classification Search ............... 370/419, 370/352, 366, 391, 488, 492, 497, 468, 437, 370/230, 235, 236, 458, 465, 470, 471, 347, 370/353–359, 473, 474, 485, 480; 375/220, 375/222, 241, 242, 286, 288
See application file for complete search history.

(56) References Cited

U.S. PATENT DOCUMENTS

| | | | |
|---|---|---|---|
| 6,128,300 A * | 10/2000 | Horton | 370/395.65 |
| 6,298,065 B1 * | 10/2001 | Dombkowski et al. | 370/420 |
| 6,411,618 B1 * | 6/2002 | Quiring et al. | 370/359 |
| 6,421,355 B1 * | 7/2002 | Quiring et al. | 370/468 |

* cited by examiner

*Primary Examiner*—Brenda Pham
(74) *Attorney, Agent, or Firm*—J. Dennis Moore; W. James Brady, III; Frederick J. Telecky, Jr.

(57) ABSTRACT

A linecard (175) permits an increased rate connection between a subscriber (15) and a service provider (40) over the PSTN (50) includes an analog interface (152) a digital interface (165) coupled to the digital backplane (170) to the service provider's host server (34), a conversion circuit (258) interspersed between the analog interface (152) and the digital interface (165), and a linecard microcontroller (300) configured to request bandwidth on the backplane (170) A linecard (175) incorporates a codec (250) with a code recognition mechanism (200) to monitor the Pulse Code Modulated (PCM) input from the provider. The code recognition mechanism (200) provides a way to dynamically allocate and deallocate timeslots on the backplane (170).

5 Claims, 3 Drawing Sheets

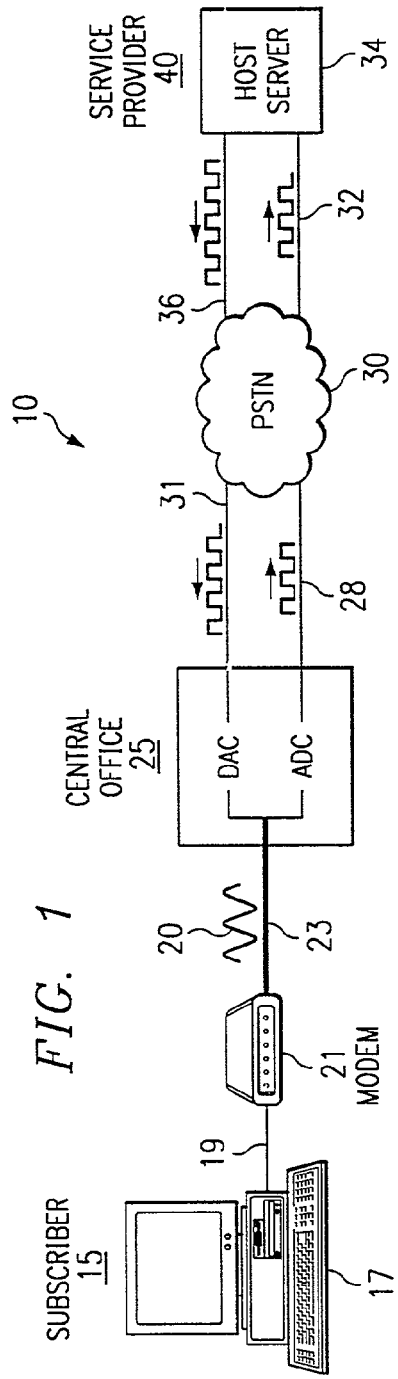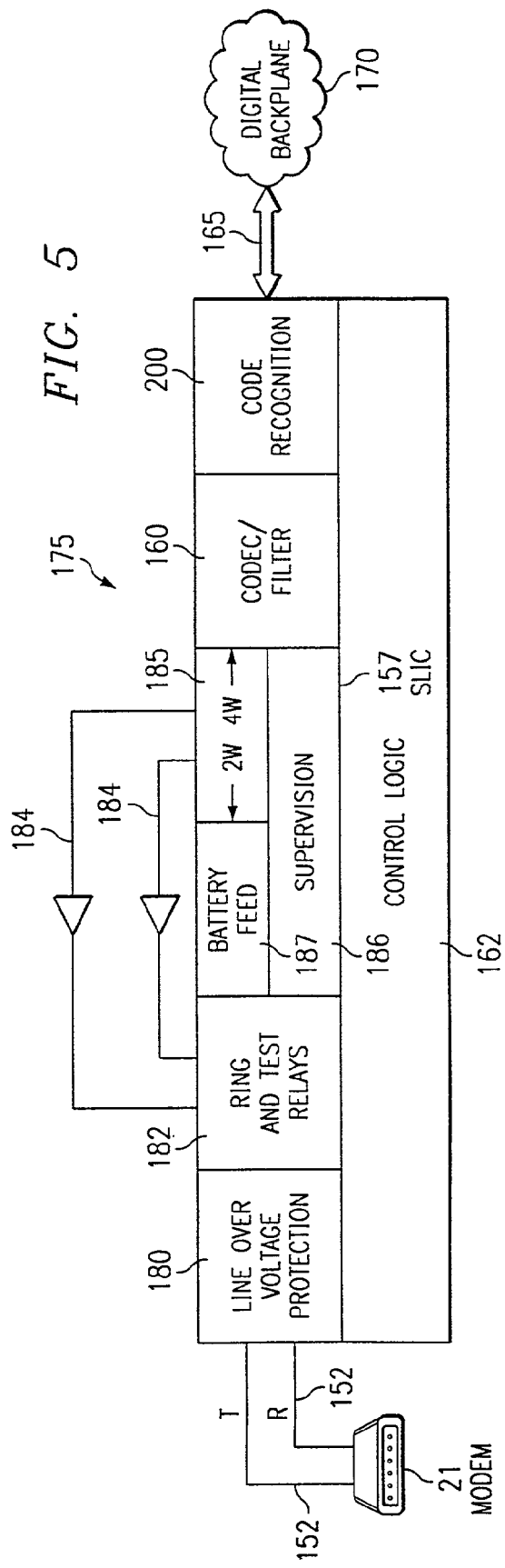

CENTRAL OFFICE LINE CARD WITH CODE RECOGNITION FOR INCREASING DATA RATES OVER PSTN

This is a division of Application Ser. No. 09/103,496, filed Jun. 24, 1998.

TECHNICAL FIELD

The invention relates generally to data communications and more particularly to high speed data transmissions over the public switched telephone network.

BACKGROUND OF THE INVENTION

The sudden popularity of the Internet as a communication tool has led to an intense push for higher data transmission rates over the Public Switched Telephone Network (PSTN). As a result, the demand for increased data transmission rates over analog twisted pair wiring is at an all time high. The most recent widespread standard is "56K" analog modem technology developed by U.S. Robotics and Rockwell/Lucent. While these technologies generally have not generated true 56 kbps performance under typical subscriber line conditions, they do provide a boost in performance from the previous standard of bidirectional 33.6 kbps.

Theoretically, a connection of 64 kbps should be attainable between the subscriber and the Internet Service Provider (ISP) via a standard Plain Old Telephone Service (POTS) connection. This is because 64 kbps is the rate at which data is transferred from the Central Office (CO) linecard to the ISP or other remote terminal. Several factors prevent this from happening including imperfect line conditions and varying local loop lengths common to POTS analog networks. The primary reason, however, for this less than the theoretical transmission rate is that the PSTN was designed to carry voiceband frequencies in the range of 300 Hz–3.4 kHz.

With the advent of digital voice systems, the decision was made to use a "companded" (compressed/expanded) data to reduce the number of bits per digital sample from a nominal 13-bits to 8-bits. Companding schemes use higher resolution at low signal amplitudes and lower resolution at high amplitudes. Companded signals are suitable for voice frequencies but not for analog modems since they limit their apparent bandwidth to a ceiling of 33.6 kbps. In practice, most analog modems are only able to achieve rates of 46–48 kbps downstream due to less-than-perfect analog line conditions.

The Analog-to-Digital ("A/D") portion of the linecard coder/decoder ("codec") is where the analog signal is converted to its 8-bit companded representation. Hence, the linecard codec acts as a bottleneck in the entire data communications chain. One way of avoiding this bottleneck is by removing the A/D conversion in the downstream direction. This is accomplished by requiring a digital connection between the provider and its CO and increasing the data throughput of the modem signals to capitalize on the extra capacity. This is the basis of 56 k technologies.

Moreover, while the use of 56K standards results in downstream data throughput of 56 kbps under ideal local loop conditions, the upstream direction must still contend with an A/D conversion into 8-bit companded data and is still limited to 33.6 kbps. Imperfect conditions in the analog local loop further degrade the signal resulting in less than the 56/33.6 kbps maximums.

Additionally, while 56K standards offer improvements over the older V.34+ standard, bandwidth is still needed to keep pace with upcoming technologies such as video conferencing, remote server access, and other high rate transmission protocols. If higher data throughput is to be achieved, the limitations in the CO need to be overcome. Overhauling the PSTN by replacing the 8-bit companded data scheme could solve the problem, but this is not a feasible solution since the cost of such as effort would be enormous.

SUMMARY OF THE INVENTION

The invention overcomes the limitation in bandwidth of prior communications standards including 56K by offering increased transmission rates using an analog modem communicating over the PSTN.

In one embodiment, an improved linecard device is disclosed. The linecard permits increased rate communications between a subscriber and a service provider over the PSTN. An analog interface couples the subscriber modem to the PSTN over a twisted pair connection from the subscriber's modem. The linecard incorporates a digital interface to the digital backplane leading to the service provider's modem. A converter is interspersed between the analog interface and the digital interface. A linecard microcontroller is configured to request bandwidth on the digital backplane.

According to one embodiment, the linecard incorporates a codec with a pattern recognition mechanism that receives code patterns from the service provider modem via the digital backplane. The code patterns from the service provider modem are decoded by the mechanism and if a predetermined code pattern is detected, a strobe signal is transmitted to the linecard microcontroller which interfaces with the digital backplane to request bandwidth.

In one embodiment, a code recognition function monitors the Pulse Code Modulated (PCM) input from the provider modem in the downstream direction. A certain amount of intelligence is employed in the code recognition mechanism to handle simple handshaking and act on the PCM codes received. The general instruction architecture places the provider modem in the master position and the codec in the slave position. The code recognition mechanism provides a way to dynamically allocate and deallocate timeslots during data communications based on code patterns received from the provider modem.

According to another embodiment, the linecard microcontroller can request more or less timeslots from the network administrator based on the code patterns received from the service provider or the subscriber. During periods of inactivity, the timeslots are deallocated to make room for other connections on the same backplane.

According to another embodiment, the codec includes a strobe terminal that permits sending interrupts to the linecard microcontroller for "on-the-fly" timeslot allocation.

A technical advantage of the invention is that it provides the subscriber with much more bandwidth than currently available with analog modems while maintaining much of the same equipment and connection methods.

Another technical advantage of the invention is that it eliminates the need to employ a direct customer interface with the CO and thus no equipment needs to be installed at the subscriber's residence. Thus, the invention allows the telecom infrastructure to be built up gradually accommodating other high rate communications protocols to support additional traffic.

Yet another technical advantage of the invention is that it permits replacement of the existing linecard in the CO with the linecard of the present invention enabling hardware and software changes at the CO to provide the increased bandwidth.

BRIEF DESCRIPTION OF THE DRAWINGS

Other aspects of the invention including specific implementations are understood by reference to the following detailed description taken in conjunction with the appended drawings in which:

FIG. 1 is a diagram illustrating a communications system wherein the invention can be practiced;

FIG. 5 is a block diagram for linecard according to one embodiment of the invention.

References in the figures correspond to like numerals in the detailed description unless otherwise indicated.

DETAILED DESCRIPTION OF PREFERRED EMBODIMENTS

Figure 2:
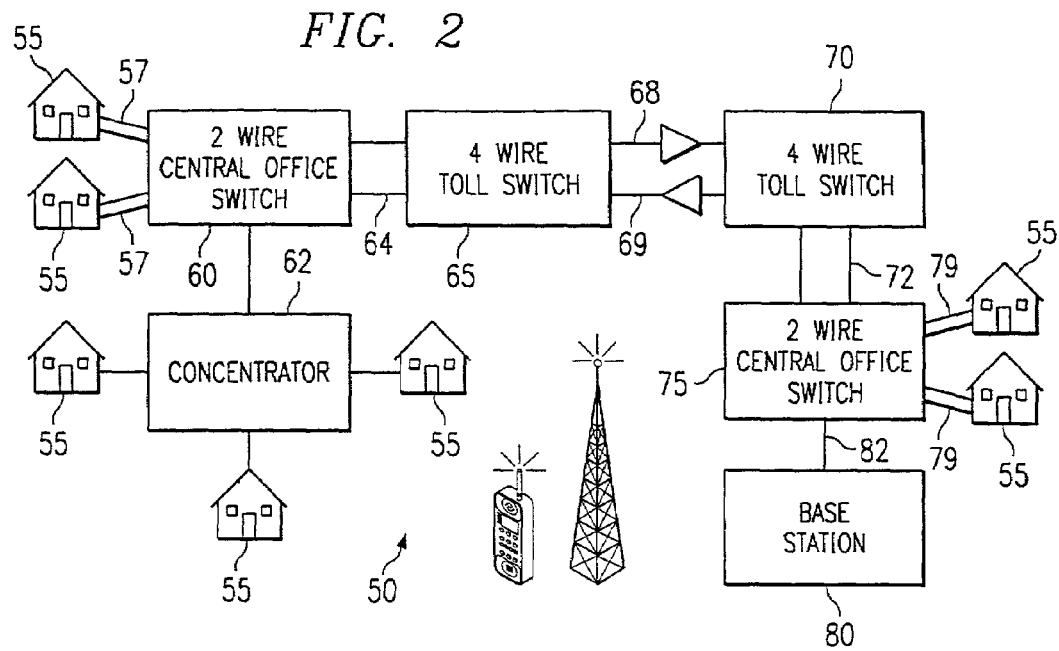
FIG. 2 is a block diagram of a typical public switch telephone network.

Referring first to FIG. 1, therein is illustrated an example communication systems 10 in which the invention can be practiced according to one embodiment. The communication system 10 includes at least one subscriber 15 communicating with a service provider 40. In general, an individual subscriber 15 has the transmission/reception and data processing equipment enabling access to the service provider 40.

A first processing system 17 is operably coupled to a modem 21 via an interface 19. The interface 19 provides a communications pathway for unmodulated data transfers between the processing system 17 and the modem 21. In other embodiments the modem 21 is internally fixed inside the processing system 17 and coupled through a standard interface of the processing system 17. As shown, the modem 21 transmits and receives analog signals 20 over communications link 23 to and from the central office 25. Typically the communication link 23 between the modem 21 and the central office 25 is twisted pair wiring of the type commonly employed in many Public Switched Telephone Networks (PSTN).

Data from the processing system 17 is transferred through the interface 19 to modem 21. The data can be temporally stored in a buffer memory or other similar device for further processing. The data is then converted from its digital format to an equivalent analog signal using the appropriate modulation rules that apply to the transmission protocol. A Digital-to-Analog Conversion (DAC) circuit or other similar signal processing device can be used for this purpose. The converted data is transmitted via the communications link 23 as modulated analog signals 20. As used herein, the analog signals 20 represent analog waveforms transmitted to and received from the central office 25. Various modulation methods can be employed including Quadrature Amplitude Modulation (QAM), Trellis Code Encoding (TCE) and Frequency Shift Keying (FSK) among others.

Modulated analog signals 20 from the modem 21 are received at the central office 25 by the Analog to Digital Converter (ADC) 27. At this point the signals 20 are converted to a digital bit stream sequence which is communicated on the PSTN 30. Preferably, the sequence is transmitted on a digital link 28 permitting high rate data transfers between the central office 25 and the PSTN 30.

Next, the digital bit stream sequence is communicated to the host server 34 maintained by the service provider 40 over the communications link 32 coupling the host server 34 to the PSTN 30. Preferably, communications between the host server 34 and the PSTN 30 are bidirectional so that digital data 31 emanating from the host server 34 is transferred to the PSTN on downstream link 36.

The DAC 26 at the central office 25 converts the bit stream sequence 31 from the host server 34 to analog equivalent signals using the modulation rules applicable to the communication protocol between the modem 21 and the central office 25. Thus, modulated analog signals 20 representatives of the digital bit stream sequence 31 from the host server 34 is transmitted to the modem 21 where it is received, demodulated and transferred to the processing system 17 of the subscriber 15.

Preferably, the communications system 10 supports both downstream and upstream communications. The modem 21 includes an Analog Front End (AFE) which acts as the interface to the central office 25 through communications link 23. Typically, a universal asynchronous receiver transmitter (UART) or other similar data flow control device is employed in the modem 21 for handling communication between the processing system 17 and the modem 21.

The processing system 17 contains suitable application programs, storage devices, memory and processing capabilities to operate the modem 21 and provide other user functions known to those of ordinary skill. The transmit and receive functions of the modem 21 and central office 25 can be implemented using known methods and devices. For example, the communications protocols between the modem 21 and the central office 25 may include those supported and standardized by the International Standard Organization (ISO), the International Telegraph and Telephone Consultative Committee (CCITT) and the Electronics Industry Association (EIA) among others.

The invention has particular application with respect to the data rate between the modem 21 and the central office 25 as well as the data rate between the central office 25 and the host server 34. In particular, the invention is specifically directed at a method and linecard device that increases the bandwidth of the communications link 23 between the modem 21 and the central office 25 and the communications links 28, 31, 32 and 36 between the central office 25 and the host server 34.

Preferably, the modem 21 is any industry accepted modulation/demodulation device available through common industry channels. In other embodiments, the modem 21 supports communications protocols not yet defined. For example, the modem 21 can support both digital and analog connections in some embodiments.

As discussed above, various line conditions on the communications link 23 often prevent the theoretical full data rate between the modem 21 and the central office facility 25 to be achieved. Preferably, the linecard of the present invention is installed at the central office facility 25 to permit increased bandwidth between the modem 21 and the central office 25. In one embodiment, the invention can be applied in any communications system where an analog carrier between a centralized communications hub and an analog communications device such as modem 21 are employed. In other embodiments, the central office 25 is capable of providing multiple time slots and at least one terminal on the commercial time system supplying data in the form of a digital bit sequence. Examples of such other communications systems are illustrated in FIGS. 2 and 3.

Referring to FIG. 2, an example PSTN 50 is shown. The PSTN 50 includes a two wire central office switch 60 which is communicably accessible by a plurality of subscribers 55 on the near end of the PSTN 60. The near end of the PSTN 50 is associated with the point of origination for a particular connection. Some of the subscribers 55 are coupled to the central office switch 60 via analog local loops 57. The analog local loops 57 are typically twisted pair wiring connection extending from the users hand set or analog modem to the central office switch 60. Other end users 55 may be coupled to a concentrator 62 which functions as a local hub to the central office switch 60 within a given geographic area. The concentrator 62 may then be coupled to the central office switch 60 using a digital linecard, pair/gain link or other similar connection medium according to various known configurations.

As shown, communications between the near end central office switch 60 and the far end central office switch 75 occur over a four wire network consisting of four wire toll switches 65 and 70 and bidirectional communications lines 68 and 69. Preferably, the four wire network 67 is a high speed digital link such as a T1 or E1 connection or other similar communications channel. Thus, the two wire central office switch 60 is coupled to the four wire toll switch 65 which forms the front end of a hybrid circuit between the central office switches 60 and 75. Preferably, the four wire toll switch 65 supports high speed bidirectional communications with the four wire toll switch 70 which, in turn, is coupled to the two wire central office switch 75. At the far end of the PSTN 50, other subscriber 55 are coupled to the far end two wire central office switch 75 via local two wire analog loops 79.

Figure 3:
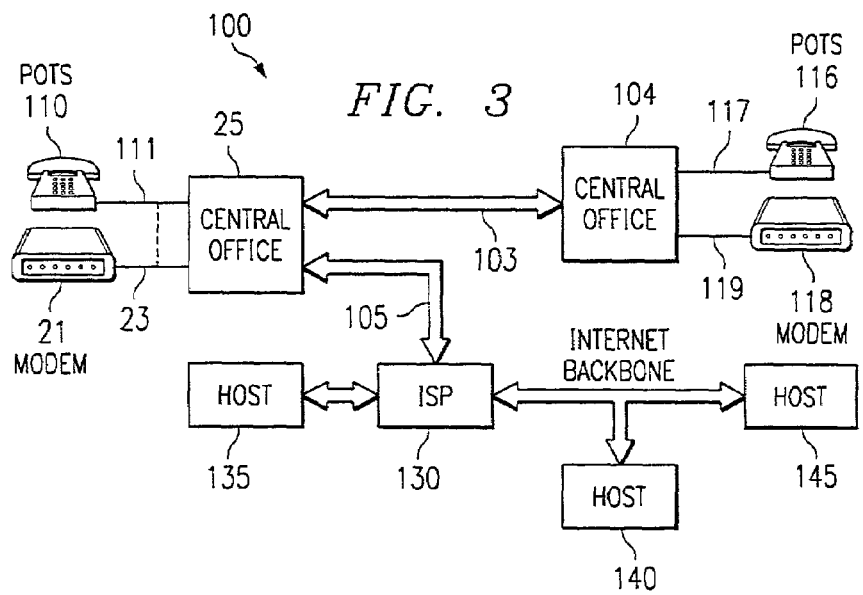
FIG. 3 is a block diagram at a communications system illustrating the arrangement of a central office with respect to an Internet service provider and subscribers.

Turning to FIG. 3, a communications system supporting both voice and digital data transmissions is shown and denoted generally as 100. A Plain Old Telephone System (POTS) 110 is coupled to the near end central office 25 via the analog link 111. Generally, the POTS is a standard telephone set used by subscribers 55 in their home, business or other location. Like, a subscriber can use an analog modem 21 to establish a connection with the near end central office 25 through communications line 23. The modem 21 can be used to gain access to the World Wide Web (WWW) via Internet Service Provider (ISP) 130.

Typically, a user may employ both his POTS 110 and the modem 21 for both voice band and digital communications on the same line 111. This configuration is represented by the dashed line in FIG. 3. In other configurations, separate communications lines (23, 111) are used between the central office 25 to the POTS 110 and modem 21, respectively. In any case, the central office 25 is the near end hub for all such communications.

In general, the ISP 130 may be accessed by a large number of users on communications system 100. A dedicated digital connection such as an Integrated Service Data Network (ISDN) T1 or E1 link may be used. Likewise, the communications link 105 between the central office 25 and the ISP130 is often a high speed digital connection providing bidirectional communications between the central office 102 and the ISP 130. A plurality of host servers 135, 140, 145 are coupled to the ISP 130 providing all the information and services available on the WWW.

A far end modem 118 is likewise coupled to the far end central office 104 via analog line 119. With the communications system 100, modem 21 and modem 118 provide subscriber access to the ISP 130 using known signaling protocols and communication standards. The invention can be used to increase the effective data rate between the modems 21 and ISP 130. The invention can also be used to increase the data rate between the ISP 130 and the central office 25.

Specifically the invention incorporates several features that enable it to multiply the amount of data that can pass through communications link 105 between the central office 25 and ISP 130. This is accomplished by replacing the existing codec section of the linecard device in the central offices 25 and 104, with an advanced codec according to the invention.

Figure 4:
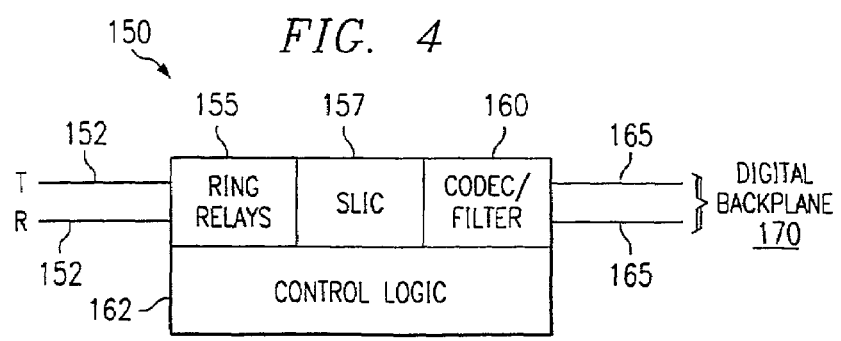
FIG. 4 is a block diagram of a prior art linecard codec.

Referring to FIG. 4, a block diagram of a prior art linecard is shown and denoted generally as 150. The linecard 150 is typically used in central offices 25 and 104, concentrator 62 or other similar central hub connection. The Tip/Ring (T/R) lines 152 carry analog waveforms from an analog modem into the linecard 150. The signals enter ring relays 155 which performs the appropriate ring detect, on-hook/off-hook functions of the linecard 150.

The ring relays 152 are coupled to the Single Line Interface Circuit (SLIC) 157 which manages the local loop between an individual subscriber and the central office point of connection. The codec/filter section of the linecard 150 160 provides the coding, decoding and filtering functions on the incoming analog signal. Since most PSTNs carry signals within the voiceband frequency range of 300–3.4 KHz, the codec/filter section 160 provides the appropriate cut-off functions that remove extraneous signal components outside the voiceband. The codec/filter section 160 may be implemented as an analog or digital filter using known designs and techniques.

The ring relays 155, SLIC 157 and codec/filter section 160 are operably controlled by the control logic 162 of the linecard 150. Codec/filter section 160 interfaces with the digital backplane 170 through local loop interface lines 165 which provide the digital interface of the linecard 150. In this way analog signals from the subscribers 55 are transmitted on the digital backplane 170, after conversion, coding and filtering. The service provider 40, which is often an ISP 130, is coupled to the digital backbone 170.

The codec/filter section 160 of the linecard 150 provides the coding and decoding functions that translate analog signals received over the T/R lines 152 to digital bit stream sequences transmitted on the backplane 170 to the service provider 40. According to the invention, the codec/filter section 160 is replaced with an enhanced codec supporting code recognition and multiple dynamic timeslot allocation functions. The fact that the enhanced codec can support code recognition and multiple timeslot allocation allows an increased bandwidth on the backplane 170 to be achieved between the central office 25 and the subscriber modem 21.

In practice, multiple linecard configurations may be employed at a central office facility as is known to those of ordinary skill. A variation of the linecard 150 is shown in FIG. 5 with the code recognition function 200 of the present invention. FIG. 5 is a detailed block diagram of a linecard device 175 according to the invention is shown coupled to a modem 21 through T/R lines 152. The T/R lines 152 feed into a line over voltage protection device 180 which performs the voltage suppression and line protection functions of the linecard 175. The ring and test relays 182 and supervision circuit 186 are operably coupled through the relay drivers 184 permitting an interface between the two wire portion of the linecard 175 and the four wire connection 165 to the digital backbone 170. A battery feed 187 maintains the central office supply levels across the linecard 175. A 2-wire to 4-wire hybrid circuit 185 provides the exchange mechanism between the 2-wire subscriber side and the 4-wire network side. Together, the supervision circuit 186, hybrid circuit 185 and battery feed 187 provide the SLIC 157 functions.

On the transmit side of the linecard 175, the codec/filter section 160 is now coupled to a code recognition mechanism 200. As before, the codec/filter section 160 is configured to massage the outgoing Pulse Code Modulation (PCM) signals which are transmitted on the backplane 170 to other entities on the network on the digital interface. Likewise, PCM signals from the digital backbone 170 are received by the linecard 175, decoded, filtered and reconstructed using appropriate signal communications protocols.

Typically, the modem 21 forms one end of a single connection loop with the linecard 175. The SLIC 157 provides the supervision 186 and hybrid 185 functions of the interface card 175 which are dedicated to the modem 121 during a single connection to the central office facility 25.

Figure 6:
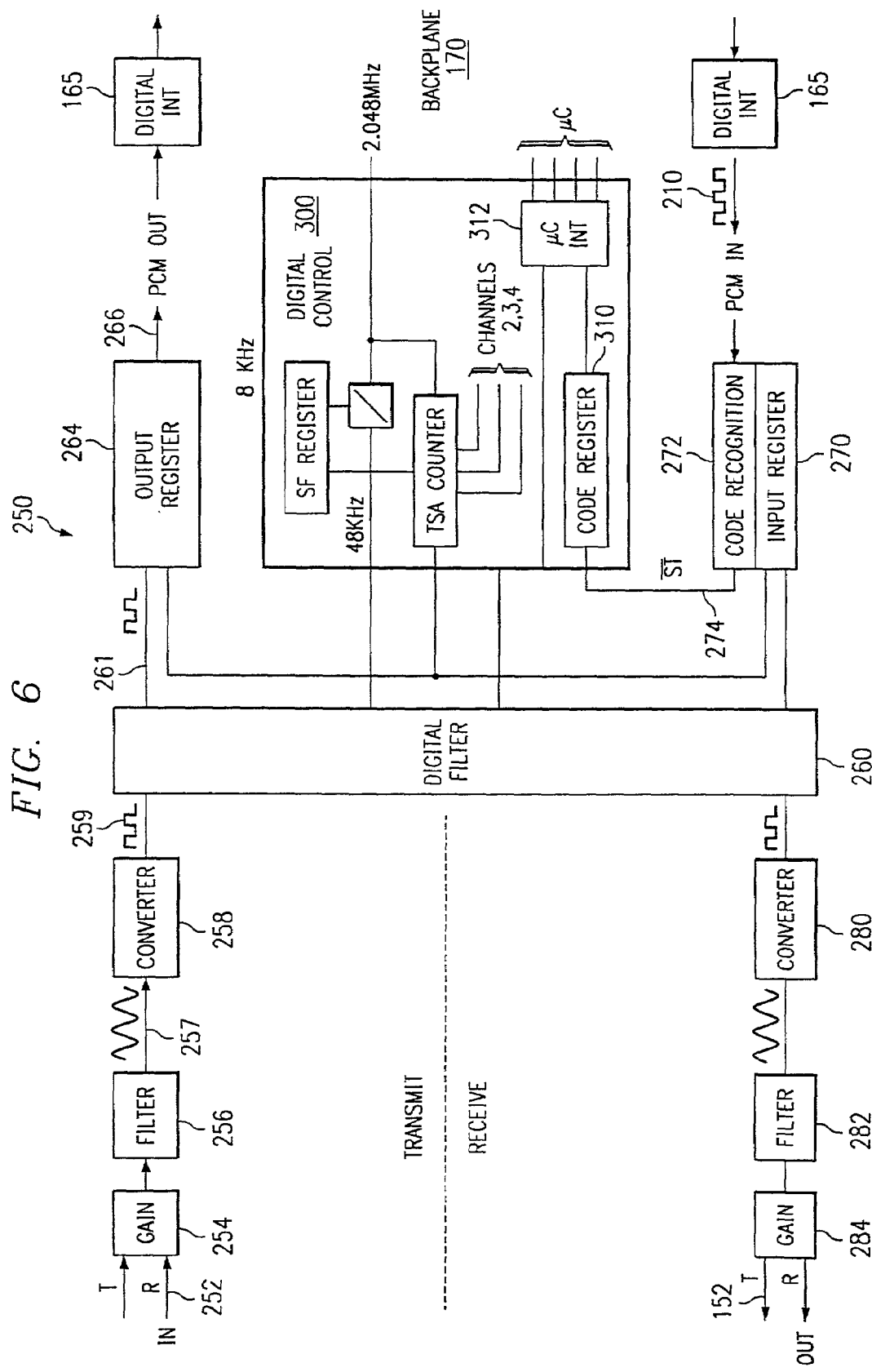
FIG. 6 is a circuit diagram for a linecard codec according to one embodiment.

Turning to FIG. 6, a circuit diagram for a linecard codec 250 according to one embodiment is shown. The codec 250 is of the sigma-delta variety although a successive approximation codec may also be used. As shown, analog waveforms enter the codec 250 through input terminal 252 and reach the gain block 254 where they are amplified to compensate for any line losses. After appropriate amplification at the gain block 254, the analog waveforms are passed through filter 256 which prevents aliasing of the converter 258. In one embodiment, the filter 256 is a low pass filter with a cut-off frequency in the high KHz range. The converter 258 typically operates at a sampling rate of at least a few MHZ.

The smoothed and filtered analog signal 257 is passed through converter 258 which implements a well known analog to digital conversion function on the signal 257 using a sampling rate at least twice the modulation frequency of the analog signal 257. Preferably the converter 258 is over sampled. The output of the converter 258 is a digital bit stream sequence 259 which is passed to the digital filter 260 for further digital signal processing.

The digital filter 260 performs a voiceband shaping function and sigma-delta decimation on the incoming sequence 259. The digital filter 260 may also be used to compensate for any loss data bits in the digital signal 259 from the convertor 258. Other processing functions may be performed by the digital filter 260 as are known to those of ordinary skill.

Next, the digital filtered signal 261 is passed to an output register 264. The output from the output register 264 is a PCM output signal 266 which is transferred on the digital backplane 170 through interface 165. The transmission protocol and methods used to relay the PCM output 266 on the digital backbone 170 are well known.

As shown, PCM signals 210 from the digital backplane 170 enter a register 270 having a code recognition mechanism 272. The fact that register 270 has a code recognition mechanism 272 enables the increased bandwidth advantages of the invention. According to one embodiment, predetermined code patterns are transmitted by the service provider 40 on the digital backplane 170 and arrive at the PCM interface 165. The patterns enter the register 270 which performs a decode function on the patterns.

Next, the code recognition mechanism 272 decodes the patterns to determine if a predetermined sequence is contained in the pattern. If a predetermined sequence is detected, an interrupt signal is transmitted on strobe terminal 274 to the code register 310 of the linecard microcontroller 300. As shown, the strobe terminal 274 extends from the code recognition mechanism 272 to the code register 310 and the interface 312.

The linecard microcontroller 300 performs the linecard control functions of the codec 250 that enable an increased throughput connection to be achieved when requested by the service provider 40. Thus, the strobe terminal 274 has the ability of interrupting the linecard microcontroller 300 based on the code patterns received from the digital backplane 170.

As is known to those of ordinary skill in the art, various means of implementing the code recognition mechanism 272 within a linecard codec 250 can be used. Accordingly, the invention encompasses a codec 250 having a pattern recognition mechanism that monitors the PCM input 165 with a certain amount of intelligence used to handle the handshaking and act on the code patterns as they are received. The provider modem is placed in the position of the transfer device and the codec 250 assumes the slave position. Preferably, the provider modem sends the code patterns and the codec 250 acts upon them.

Once the code register 310 receives the strobe signal from the code recognition mechanism 272 it passes the code pattern to the microcontroller interface 312. Preferably the microcontroller interface 312 is configured to request bandwidth on the digital backplane 170 from the network administrator. Thus, more or less bandwidth may be allocated for a particular connection through the interface 312.

In practice, the linecard obtains the number of timeslots allowed to the requesting channel through the codec 250 using the microcontroller interface 312. When the linecard microcontroller 300 has determined which timeslots in the backplane 170 have been allocated to that connection, it programs the codec 250 to transmit and receive data on all assigned timeslots. In one embodiment, the codec 250 sends signals to the provider modem indicating that it has been configured for an increased throughput connection along with how many timeslots have been allocated. The provider modem connects to the corresponding timeslots on its line and begins sending a mapping table to the codec 250 which can be stored in the codec 250.

The provider modem can transmit a signal to the subscriber modem 21 indicating that an increased data throughput connection has been achieved and that the connection will progress using the increased connection rate. Likewise, the subscriber modem can be configured to tell the ISP modem that it wants to establish an increased throughput connection. The subscriber modem waits while the provider modem sends a predefined code pattern to the central office codec 250 that interfaces with the subscriber modem 21. The codec 250 is able to recognize the code patterns and upon receiving then sends a strobe to the linecard microcontroller 300 on strobe terminal 274 indicating that an increased throughput connection has been requested. Through the interface 312, the microcontroller 300 petitions for additional timeslots from the network. The network obtains the number of timeslots allowed for that subscriber line and allocates them to the requesting channel.

In one embodiment, the codec 250 is in "voice" mode by default, operating in the same manner as any standard POTS 110. This means that the filters 256 pass 300–3400 Hz and the converter 258 samples accordingly using a single timeslot in the backplane 170. When a subscriber initiates a modem connection, the modem creates a low-rate connection with the modem at the service provider that requires only one timeslot (such as V.34+).

During much of a typical modem connection, no activity is taking place. For this reason, the present invention also encompasses a method to deallocate extra timeslots during periods of inactivity. When the provider modem has determined that the line 165 has been idle for a predetermined amount of time, it sends a predetermined code to the subscriber modem initiating a throttle-down to a low-rate protocol that requires only one timeslot on the network. The provider modem then sends a predefined bit sequence to the codec 250. The codec 250 recognizes this bit sequence and sends a strobe to the microcontroller 300, giving the microcontroller 300 permission to switch the codec 250 to "single-timeslot" data mode. In this mode, only one timeslot is used. To deallocate the secondary timesiots, the microcontroller 300 interfaces with the network through the interface 312. Once the timeslots have been deallocated, the linecard microcontroller 300 re-programs the codec 250 for its primary timeslot only. The codec 250 signals sends to the provider modem and immediately begins transceiving on the primary timeslot.

A return to "multiple-timeslot" data mode is accomplished in the similar manner as it was during the original establishment of the increased throughput connection. Within a single connection, the protocol may switch between single-timeslot data mode and multiple-timeslot data mode an indefinite number of times. In this way, maximum efficiency over the communication system is achieved.

While the invention has been described in conjunction with preferred embodiments, it should be understood that modifications will become apparent to those of ordinary skill in the art and that such modifications are intended to be included within the scope of the invention and the following claims.

What is claimed is:

1. A linecard codec for increasing the data rate between a service provider modem and a central office switch wherein the communications link between the service provider modem and the central office is a digital connection, the linecard codec comprising:

an interface to the digital connection;

an input means having an input register and coupled to the interface for receiving digital data from the service provider, said input means provided to perform a code recognition and being configured to detect predetermined code patterns transmitted by the service provider; and a microcontroller coupled to said input register and configured to format requests for bandwidth on the digital connection.

2. The linecard codec according to claim 1 further comprising a strobe terminal extending from the microcontroller to the input means.

3. The linecard codec according to claim 2 wherein the code recognition mechanism is configured to generate an interrupt to the microcontroller over said strobe terminal upon receipt of a predetermined code pattern from the service provider.

4. The linecard codec according to 1 further comprising a convertor coupled to said microcontroller and configured to convert digital data received from said service provider to analog waveforms suitable for transmission on a public switched telephone network.

5. The device according to claim 4 further comprising a filter coupled to said converter and configured to prevent aliasing of said converter.

* * * * *